United States Patent [19]

Franklin

[11] 4,376,481

[45] Mar. 15, 1983

[54] DEVICE FOR ARRANGING IN ORDER A RANDOM SUPPLY OF ARTICLES

[75] Inventor: Kenneth W. Franklin, Fenny Compton, England

[73] Assignee: Wentcroft Engineers Limited, Southam, England

[21] Appl. No.: 131,500

[22] Filed: Mar. 18, 1980

[30] Foreign Application Priority Data

Mar. 20, 1979 [GB] United Kingdom ................ 7909769

[51] Int. Cl.³ ...................... B65G 47/24; B65G 47/38
[52] U.S. Cl. .................................. 198/382; 198/396; 198/413; 414/759; 414/774
[58] Field of Search ............... 198/382, 396, 413, 630; 414/774, 759

[56] References Cited

U.S. PATENT DOCUMENTS

| | | | |
|---|---|---|---|
| 1,865,086 | 6/1932 | Cutler | 198/382 |
| 2,377,431 | 6/1945 | Lakso | 198/382 |
| 2,633,971 | 4/1953 | Albertoli et al. | 198/396 |
| 2,714,832 | 8/1955 | Seed et al. | 198/382 X |
| 2,840,090 | 6/1958 | Bradford | 198/630 X |
| 3,068,989 | 12/1962 | Packman et al. | 198/382 |
| 3,841,461 | 10/1974 | Henderson et al. | 198/630 |

FOREIGN PATENT DOCUMENTS

2139431 2/1973 Fed. Rep. of Germany ...... 198/396

Primary Examiner—Robert B. Reeves
Assistant Examiner—Howard Beltran
Attorney, Agent, or Firm—Schuyler, Banner, Birch, McKie & Beckett

[57] ABSTRACT

A device for arranging in order a random supply of articles including a plurality of article orientating members movable relatively to each other. The members are spaced so that the articles, when orientated, can drop between the members. The members may comprise intercalating elongate blades, alternate blades being arranged to move in unison relative to intermediate blades and may be provided for conveying the orientated articles from between the blades to a receiving station.

5 Claims, 13 Drawing Figures

DEVICE FOR ARRANGING IN ORDER A RANDOM SUPPLY OF ARTICLES

In the packing art it is necessary at times to pack articles which are supplied in a random orientation from a machine such as a freezer. Before packing can take place, it is necessary to arrange the articles in a suitable order for delivery to a packing machine. However, where frozen food products are being handled for packing, it is important that any device used for rearranging the products does so quickly to avoid any undesirable temperature increase in the frozen products. An object of the invention is to provide a device for arranging in order a random supply of articles and which is particularly, but not exclusively, intended for use in re-arranging a random supply of frozen food products.

According to the invention there is provided a device for arranging in order a random supply of articles, including a plurality of article orientating members movable relatively to each other, said members being spaced so as to receive between them the articles orientated by the members.

The article orientating members preferably intercalate and alternate members are drivable so as to move in unison. Preferably, the movement of adjacent members is 180° out of phase.

The members may be in the form of blades, the movement of which is arranged to take place in the plane of each blade. This arrangement provides a particularly neat form of device, the sides of the blades constituting side walls of the space which receives the correctly orientated articles.

The desired movement is conveniently achieved by using a crank driving mechanism, at least one crank being provided for each member.

Each member may be elongate and mounted on a pair of cranks which are in phase and rotate at the same speed so that the locus of any point on a member is a circle and each member has a parallel motion.

Alternatively, each elongate member may be pivotally connected at one end to support means and connected to the crank at its other end so that rotation of the crank will impart a reciprocal arcuate movement to the member. In such a case, the members preferably reciprocate upwardly and downwardly and have upper article engaging surfaces which are inclined during the entire movement of the members.

An article supporting surface may be arranged between each member on which the article orientated by the members is permitted to rest. In one embodiment, the supporting surface is a conveyor which conveys the orientated articles out of the space between the members. In another embodiment, the article supporting surfaces are contained in an inclined plane and the members are arranged to move below the surfaces to allow the articles to pass from one article supporting surface to another as they move through the device towards a receiving station.

Devices in accordance with the invention will now be described by way of example with reference to the accompanying drawings in which.

Figure 1:
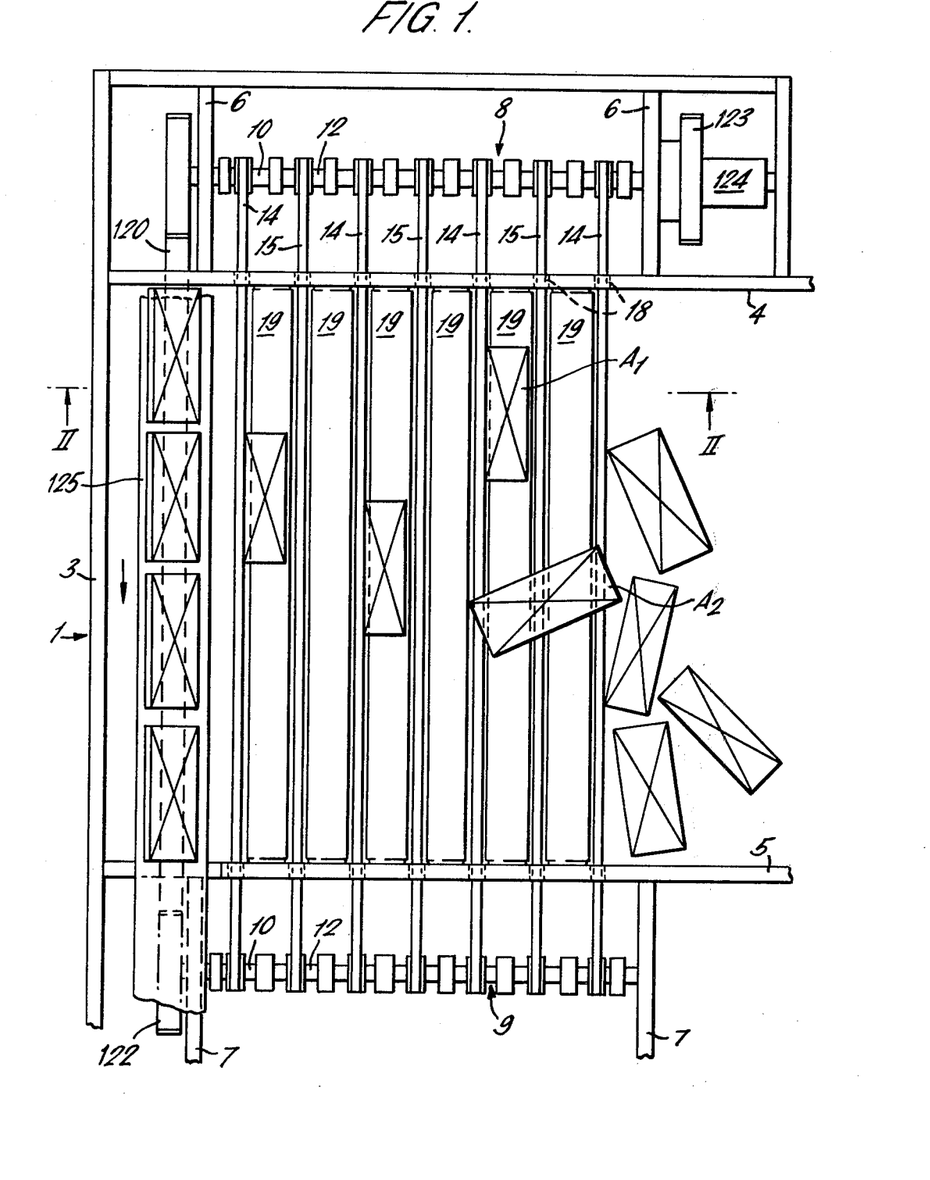
FIG. 1 is a plan view of one form of the device in accordance with the invention.
Figure 2:
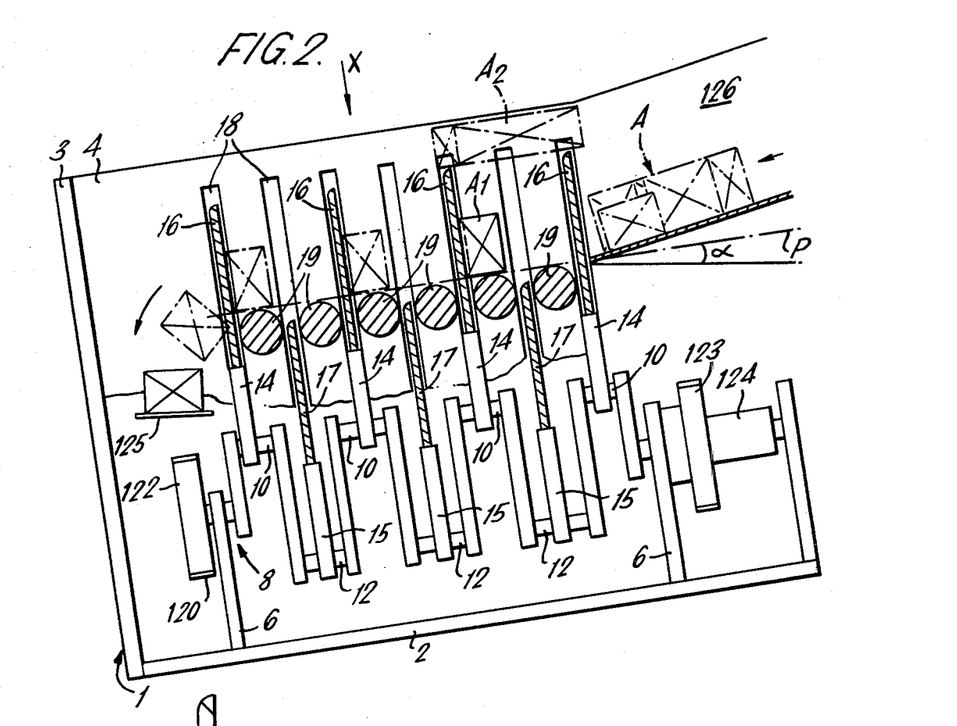
FIG. 2 is a cross-section of the device of FIG. 1 on the line II—II in FIG. 1, FIGS. 3 to 6 are cross-sectional end views of article orientating blades in different positions showing an article passing through the device.

Referring firstly to FIGS. 1 and 2, a housing indicated generally at 1 has a baseplate 2, an end wall 3 and side walls 4, 5. The baseplate 2 has upstanding mountings 6, 7 for respective crankshafts 8, 9. Each crankshaft has two sets of coaxial cranks 10, 12. The sets are of equal throw and are angularly spaced by 180°. As seen from FIG. 1, the cranks 10, 12 of crankshaft 8 are coupled to the cranks 10, 12 of crankshaft 9 by equally spaced parallel coupling bars 14, 15 respectively. The coupling bars 14, 15 carry upstanding blades 16, 17 respectively along their upper edges. The blades 16, 17 have rounded upper edges and extend through slots 18 in the side walls 4 and 5. Support bars 19 for supporting articles A as they pass through the device are arranged between adjacent blades 16, 17. The support bars 19 are carried by the side walls 4, 5 and their uppermost surfaces are contained in a common plane P.

The crankshafts 8, 9 are arranged in phase and are drivably interconnected by means of a toothed belt 120. The belt 120 meshes with toothed pulleys 122 on the left hand ends of the crankshaft as viewed in the drawings. Drive input to the crankshaft is by a pulley 123 via a clutch 124 coaxial with the crankshaft 8.

A conveyor belt 125 having a drive (not shown) has its upper run arranged between the end wall 3 and the adjacent blade 16 and is below the plane P.

As seen in FIG. 2, the device is inclined to the horizontal by an angle $a$. Normally the device is associated with an inclined hopper 126 which receives articles A having a random orientation from supply means (not shown). From the drawings it will be appreciated that articles A are of parallelpiped shape having a thickness slightly less than the spacing between adjacent blades.

In use the crankshafts 8, 9 rotate and follow a circular path, adjacent blades 16, 17 moving relatively to each other 180° out of phase. At their lower points of movement, the upper edges of the blades lie below the plane P. When the blades 16 descend below the plane P, one or more articles in the hopper slide wholly or partly on to the right-hand support bar 19. The adjacent blade 17 above the plane P prevents the articles moving further to the left. As the right hand blade 16 rises and its upper edge moves sideways, and the adjacent blade 17 descends and moves sideways in the opposite direction, any article resting partly on the right hand support bar 19 is turned and simultaneously tipped towards the next support bar. As the adjacent blade 17 descends below the plane P, the article slides on to the next support bar and abuts the next blade 16. The article is again turned and tipped as the blades ascend and descend and eventually the article takes up the position indicated at $A_1$.

Figure 3:
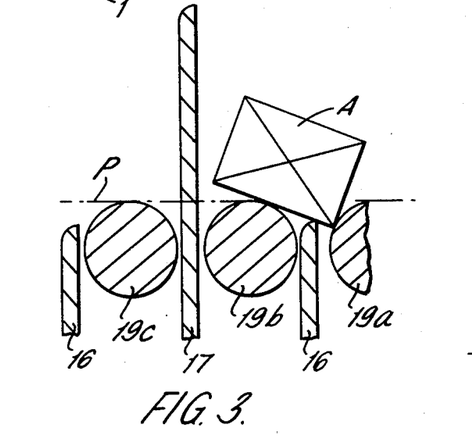
Figure 4:
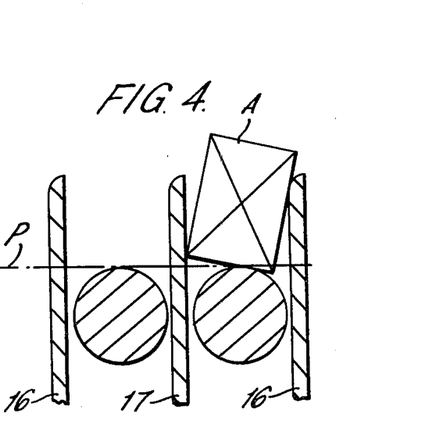
Figures 5, 6:
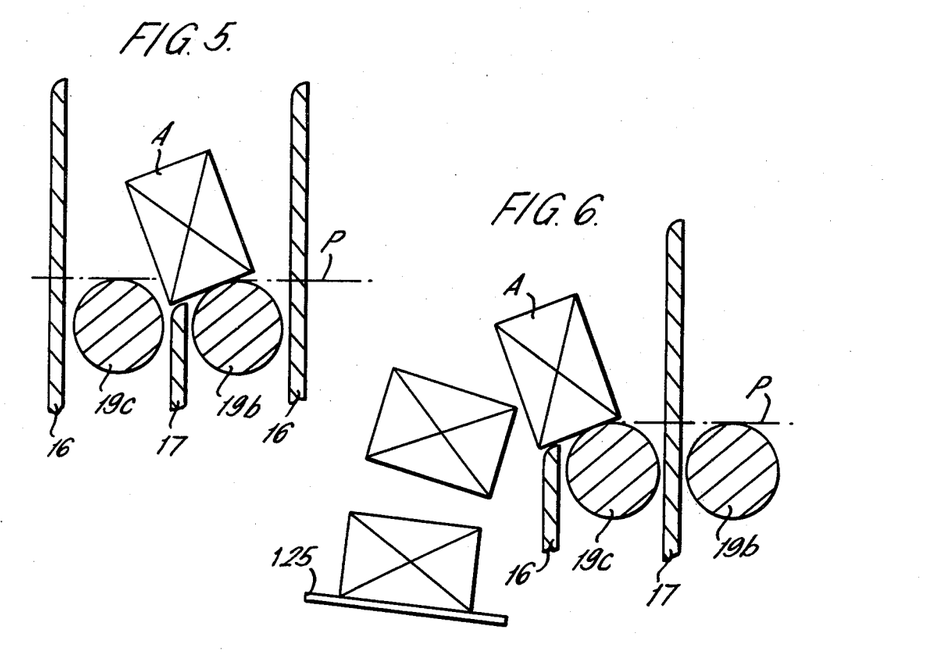

Once an article is orientated in that manner, it travels through the device as shown in FIGS. 3 to 6. In FIG. 3, the article A has toppled from one support bar 19a to the adjacent support bar 19b and lies partly across the retracted right hand blade 16. The ascending right hand blade 16 tips the article so that its narrow edge rests on the support bar 19b. As the blade 17 descends below the plane P as in FIG. 5, the article topples on to support bar 19c. The procedure is then repeated until the article falls towards the conveyor belt 125 following the descent of left hand blade 16 below plane P as in FIG. 6. The conveyor belt delivers the articles one behind the other as shown in FIG. 1 towards a suitable packing machine.

Figure 7:
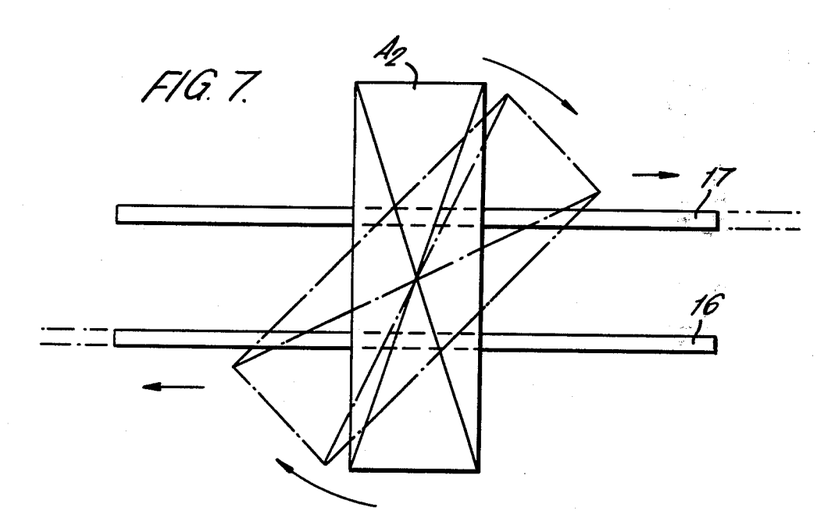
FIG. 7 is a diagrammatic plan view of two of the blades carrying an article.
Figure 8:
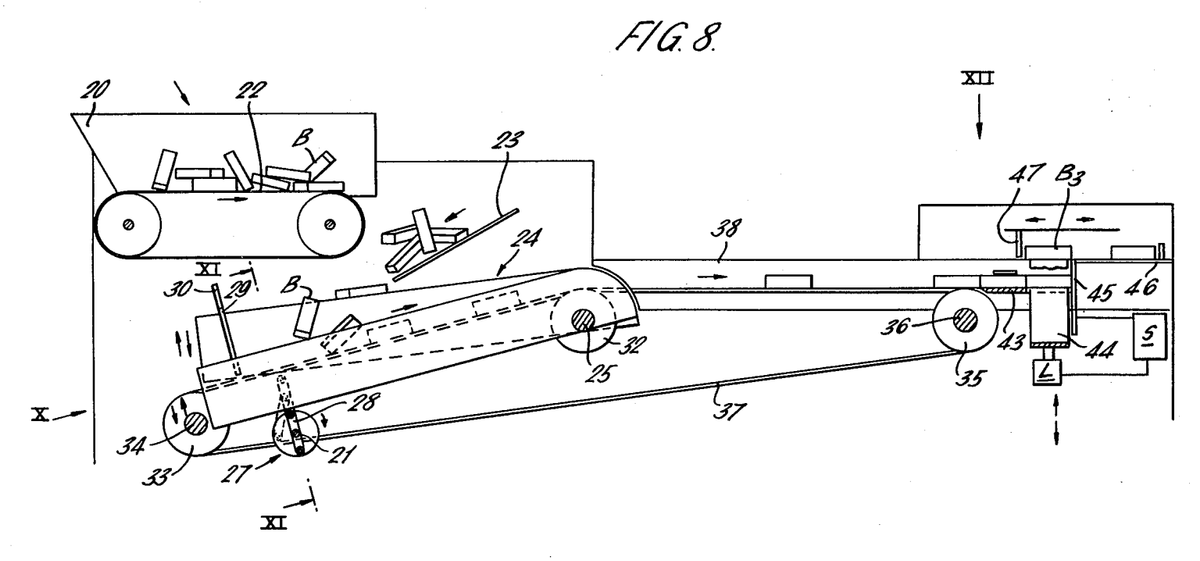
FIG. 8 is an elevation of an alternative device in accordance with the invention.
Figure 9:
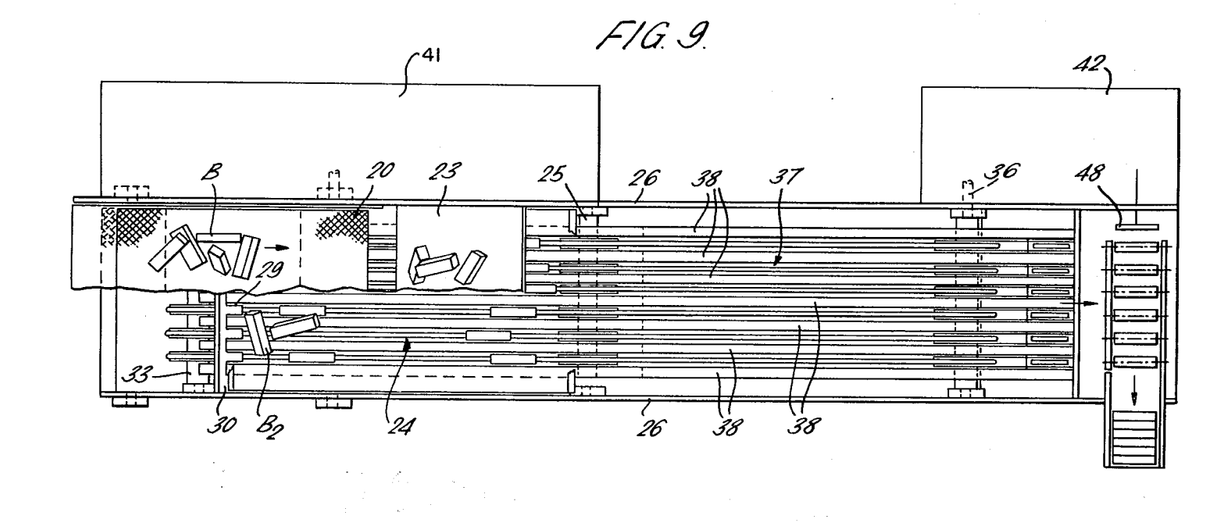
FIG. 9 is a plan view of the device shown in FIG. 8.
Figure 10:
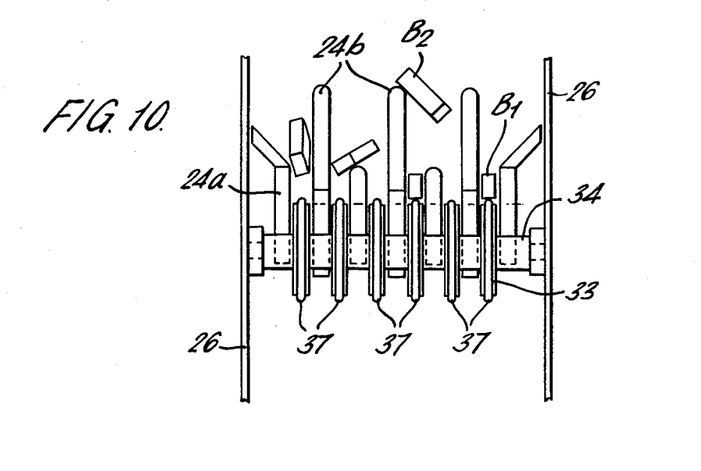
FIG. 10 is a view of the device shown in FIG. 8 looking in the direction of arrow X in FIG. 8.
Figure 11:
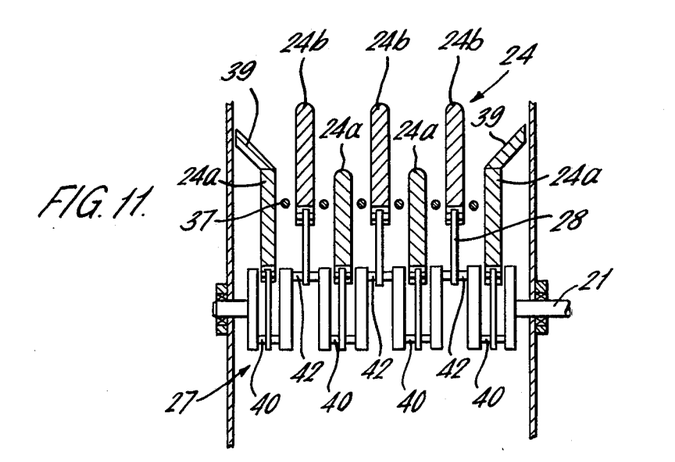
FIG. 11 is a cross-section of the device shown in FIG. 8 on the line XI—XI in FIG. 8.
Figure 12:
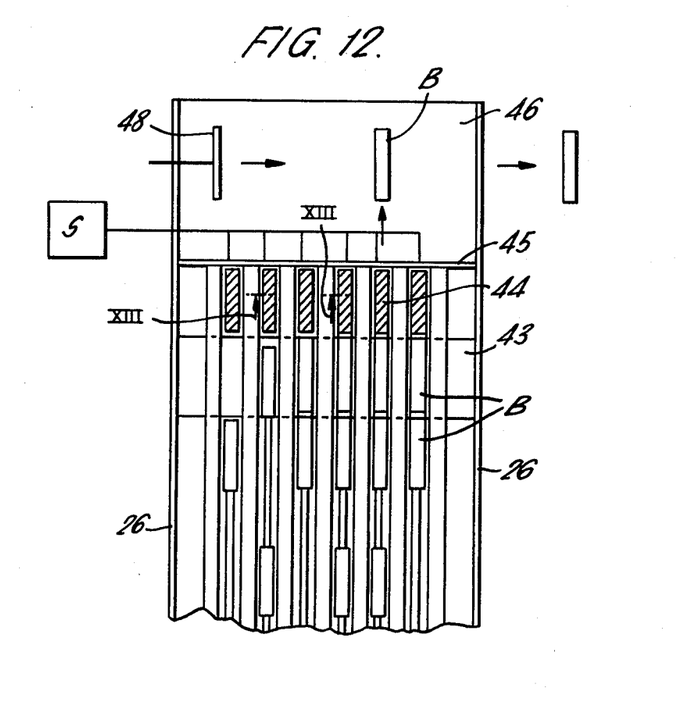
FIG. 12 is a plan view of one end of the device shown in FIG. 8 looking in the direction of arrow XII in FIG. 8.

At times, an article ($A_2$ in FIGS. 1 and 7) may slide diagonally on to the right hand support bar 19. It may still maintain that position approximately as the adjacent blade 17 descends so that it then slides partly on to the next support bar. It will, of course, be lifted by the previously retracted blade 17 as the latter ascends but, as the blade 17 subsequently descends, the article $A_2$ can be left bridging the gap between two blades 16 as in FIG. 1. However, as the two blades 16 carrying the article descend and move sideways, the rising intermediate blade 17, which is moving sideways in the opposite direction, strikes the article and the blades turn the article as in FIG. 7. The article $A_2$ is then unable to bridge two alternate blades and eventually takes up the desired orientation between adjacent blades.

Any number of blades upwards of two can be used and, as will be appreciated, the width of the article receiving space between adjacent blades is dependent on the thickness of the articles to be re-arranged by the device.

Referring now to FIGS. 8 to 12 a hopper 20 has a conveyor 22 which conveys articles B to a chute 23. The conveyor 22 and chute 23 extend across six parallel blades indicated generally at 24 which are pivoted at their right hand ends as viewed in FIGS. 8 and 9 on a shaft 25 carried by side walls 26 of the device. Adjacent their opposite ends, the blades 24 are pivotally connected to respective cranks indicated generally at 27 by connecting rods 28. The cranks are carried by a driving shaft 21. The left hand ends of the blades 24 project with working clearance through slots 29 in an inclined plate 30 carried between the side walls 26. The shaft 25 carries six pulleys 32 arranged in the spaces between the blades 24, and six similar pulleys 33 are carried by a shaft 34 adjacent the driving shaft 21. Six futher pulleys 35 are carried by a driving shaft 36 and respective belts indicated generally at 37 pass around the pulleys, 32,33 and 35 the upper run of each belt passing between the blades 24 and between seven stationary side guides 38.

Looking at the blades 24 in more detail, there are two sets of blades 24a, 24b (FIG. 11) which intercalate. The blades 24a are connected to coaxial crankpins 40 and the blades 24b are connected to coaxial crankpins 42 which are spaced by 180° from the crankpins 40. The outermost blades 24a have out-turned flanges 39 at their upper ends which terminate closely adjacent the side walls 26. The shaft 21 is driven by a motor (not shown) in a housing 41 and, as it rotates, the blade sets move up and down relative to each other about the shaft 25.

Figure 13:
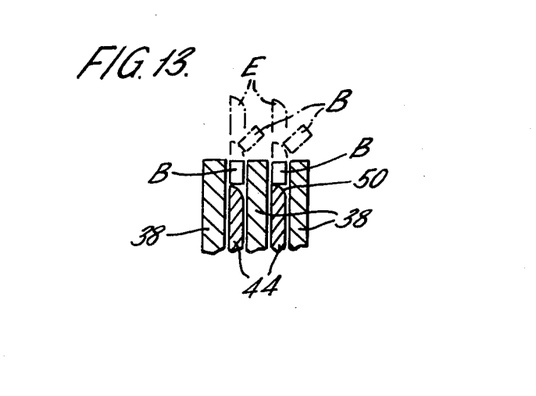
FIG. 13 is a cross-section through the device shown in FIG. 12 on the line XIII—XIII in FIG. 12.

In use, the articles B are fed to the chute 23 from which they slide on to the blades 24. It will be noted from FIG. 8 that the blades are tilted downwardly from the shaft 25 so that there is a tendency for the articles B to move along the tops of the blades towards the tilted plate 30. Looking at FIG. 10, an article $B_1$ has slipped into the space between blade 24a and adjacent blade 24b and is resting on the belt 37 between them. The belts 37 are driven by shaft 36 so as to move the articles to the right as viewed in FIGS. 8 and 9. The shaft 36 is driven by a motor (not shown) in a housing 42. The article $B_2$ (FIGS. 9 and 10) has fallen transversely on to the blades but due to the relative movement of the blades 24a, 24b coupled with the slope of the blades, the article $B_2$ will be oriented so as eventually to fall into the article receiving space between two adjacent blades. The slope of the blades assists in producing a "turning" effect on the article $B_2$ and the upward and downward arcuate movement of adjacent blades also tends to turn articles lying across them. Once an article falls on to the belt 37, it is carried from between the blades and between the side guides 38 to a stationary plate 43 where the article stays until it is pushed by the next arriving article fully on to plate 43. A further article arriving pushes the first article off the plate 43 on to an elevating finger 44 and against a stop 45. A sensing device S senses when an article has arrived on each finger 44 and then triggers a lifting device L which elevates the fingers 44. The fingers are of sufficient depth to prevent further articles being moved into contact with the stop 45 until the fingers descend to their starting position. Referring to FIG. 13, the elevating fingers 44 have radiused upper edges 50. When the articles B are raised by the fingers, the articles tip to one side as shown in broken lines in FIG. 13 and eventually come to rest on top of the side guides 38 as shown at $B_3$ in FIG. 8. The articles are then pushed on to a transfer platform 46 by a pusher 47 from which they are conveyed to a delivery station. The elevating fingers 44 remain in their elevated positions E until the articles have been pushed on to the delivery platform. If it is desired to close up the gaps between articles caused by the side guides 38, a further pusher 48 (FIG. 12) acting at right angles to the pusher 47 may be provided adjacent the transfer platform 46.

The spacing between the blades can be varied depending upon the size of the articles being sorted.

The device is particularly useful for the re-arranging of frozen food products such as fish fingers which are delivered from a refrigerator outlet in to the hopper in a random manner. It is essential to pack such products as quickly as possible to avoid thawing and a device in accordance with the invention can be run at fast speeds to give a high throughput of products.

The foregoing disclosure and description of embodiments of the invention are illustrative and explanatory thereof and many changes in construction and widely differing embodiments and applications of the invention will be obvious to those skilled in the art without departing from the spirit or scope of the invention.

What I claim as my invention and desire to secure by Letters Patent of the United States is:

1. A device for arranging in order a random supply of articles comprising a plurality of spaced apart elongate article orientating blades, mounting means for said blades, drive means for driving the mounting means so that the blades move in a rotary path in the respective planes of the blades with each said blade having a parallel motion relative to said mounting means, an article engaging upper surface on each blade which during the rotary path of movement moves in an opposite longitudinal direction to the upper surface of an adjacent said blade so as to impart a turning movement to any article resting on the adjacent upper surfaces thereby orientating the article to enable it to be received between the blades, and means adjacent the blades for receiving the articles orientated by the blades including surfaces arranged in the space between adjacent blades and on which the articles rest in the desired orientation.

2. A device according to claim 1 in which the mounting means comprises eccentric means mounted on shafts spaced apart in the longitudinal direction of the blades.

3. A device according to claim 1 in which alternate blades are drivable so as to move in unison.

4. The device according to claim 1 in which adjacent blades are driven so that their movement is 180° out of phase.

5. A device according to claim 1 in which the means adjacent the blades for receiving the articles orientated by the blades includes conveyor means for conveying the orientated articles away from the blades.

* * * * *